United States Patent [19]

Ida

[11] Patent Number: 5,649,340
[45] Date of Patent: Jul. 22, 1997

[54] CORD RETAINER

[75] Inventor: Kazuo Ida, Toyama-ken, Japan

[73] Assignee: YKK Corporation, Tokyo, Japan

[21] Appl. No.: 604,565

[22] Filed: Feb. 21, 1996

[30] Foreign Application Priority Data

Feb. 28, 1995 [JP] Japan .................................. 7-039762

[51] Int. Cl.⁶ .................................................. F16G 11/00
[52] U.S. Cl. ...................................... 24/115 G; 24/136 R
[58] Field of Search ............................. 24/115 G, 115 M, 24/115 R, 115 F, 136 R, 136 L; 403/146

[56] References Cited

U.S. PATENT DOCUMENTS

| | | | |
|---|---|---|---|
| 4,453,292 | 6/1984 | Bakker | 24/115 G |
| 4,622,723 | 11/1986 | Krauss | 24/115 G |
| 4,724,584 | 2/1988 | Kasai | 24/136 R |
| 4,794,673 | 1/1989 | Yamaguchi | 24/115 G |
| 5,224,245 | 7/1993 | Matoba | 24/115 G |

*Primary Examiner*—Victor N. Sakran
*Attorney, Agent, or Firm*—Hill, Steadman & Simpson

[57] ABSTRACT

A cord retainer comprising an outer tube, a slide, and a plug. The slide has a cord insertion hole and a pair of legs. The outer tube has a pair of horizontal cord insertion holes and in its inside surface a number of guide grooves; some guide grooves have each an aligning engagement portion while the remaining guide grooves have each a holding engagement portion. The plug has a number of locking strips, some of which have each at its upper end an aligning projection and at its base a holding projection while the remaining locking strips have each at its upper end a holding projection. The plug further has a cam surface as an inside surface an insertion portion. In use, the plug is inserted into the tube from the lower end until each aligning projection comes into engagement with the respective aligning engagement portion, and the slide is inserted into the tube from the upper end until the hole of slide is aligned with the holes of the tube, facilitating threading a cord through the slide and the tube. With the cord inserted, if the plug is pushed up into the tube to be completely assembled, the legs come into contact with the cam surface to resiliently urge the slide upwardly to retain the cord. For adjusting the cord, the slide is pressed down.

13 Claims, 12 Drawing Sheets

CORD RETAINER

BACKGROUND OF THE INVENTION

1. Field of the Invention

This invention relates to a cord retainer, generally called as a cord stopper, for retaining a cord threaded through the hem, waist or collar of a skiwear, a down jacket, a short coat or the like, or through the peripheral edge of a hood of a down jacket. The cord retainer is to be attached to an end cord.

2. Description of the Related Art

FIG. 12 of the accompanying drawings shows a conventional cord retainer in which a slide 100 has a cord insertion hole 101 and a pair of downwardly projecting resilient legs 102 and, on the other hand, a one-end-closed cylindrical outer tube 200 has a pair of cord insertion holes 201 and a slope 202 at a lower part of an inside surface thereof. The resilient legs 102 are frictionally engageable with the slope 202 so that the slide 100 can have a resiliently urging mechanism (Japanese Utility Model Publication No. 1-39449).

FIG. 13 shows another conventional cord retainer in which a slide 110 has a cord insertion hole 111 and a projection 112 and, on the other hand, a cylindrical outer tube 210 has a pair of cord insertion holes 211 and an L-shape through-hole 213, with a non-illustrated bottom closure is fitted in a lower tube end. And the slide 110 is inserted in the outer tube 210 in such a manner that the projection 112 of the slide 110 is received in the L-shape through-hole 213, and a coil spring 214 is situated between the slide 110 and the bottom closure so that the slide 110 can have a resiliently urging mechanism (Japanese Utility Model Laid-Open Publication No. Hei 5-93224).

FIG. 14 shows still another conventional cord retainer which comprises a slide 120, an outer tube 220, a holding ring 222 and a coil spring 224. The slide 120 has a cord insertion hole 121 in its stem 122 and a pair of resilient legs 123 extending downwardly from the stem 122 and terminating each in a locking projection 124. The outer tube 220 is in the form of a cylinder with one end closed as a bottom, having a pair of cord insertion holes 221 in a tube wall and a central recess 223 in the bottom. The holding ring 222 is held around the legs 123 against the locking projections 124 with the coil spring 224 being compressed. Then as the slide 120 is inserted into the outer tube 220, the cord insertion hole 121 of the slide 120 is aligned with the cord insertion holes 221 of the outer tube 220. Then if the slide 120 is pressed down, the legs 123 are compressed by the central recess 223 of the tube bottom so that the holding ring 222 is removed off the legs 123. Thus the slide 120 can have a resiliently urging mechanism. This conventional cord retainer is disclosed in Japanese Patent Laid-Open Publication No. Hei 6-14807.

According to the conventional cord retainer disclosed in the first-named publication, the slide is resiliently urged by the combination of the resilient legs of the slide and the slope of the outer tube. However, any machanism for aligning the cord insertion holes of both the slide and the outer tube is provided. In the absence of such aligning mechanism, it is laborious and time-consuming to insert a cord through the cord retainer.

According to the second-named conventional cord retainer, for aligning the cord insertion holes of both the slide and the outer tube, it is essential to press the slide to compress the coil spring and also to turn the slide with respect to the outer tube, which is laborious and time-consuming. Further since the slide automatically restores the cord retaining position from the aligned position under the resiliency of the coil spring, smooth insertion of the cord cannot be achieved.

According to the third-named conventional cord retainer, the number of component elements or parts is relatively large and it is therefore laborious and time-consuming to assemble the cord retainer and especially to attach the coil spring. Further, for shifting from the aligned position to the cord retaining position, the cord is inserted through the slide and the outer tube with the cord insertion holes in alignment and it is necessary to press the slide further from the aligned position to remove the holding ring, which is very laborious due to the existence of the cord and the compressing process of the coil spring.

SUMMARY OF THE INVENTION

It is therefore an object of this invention to provide a cord retainer which is composed of a reduced number of parts or elements and hence is easy to be assembled and which enables smooth insertion of a cord and a very simple shifting operation from the aligned position to the cord retaining position so that the slide is kept in a proper posture without being inclined when the cord is retained, thus retaining the cord smoothly and reliably.

To accomplish the above object, according to the invention, there is provided a cord retainer comprising: an outer tube having a pair of first cord insertion holes in a tube wall; a slide having a stem to be slidably inserted in the outer tube from one end, the stem having a second cord insertion hole; and a plug to be inserted in the outer tube from the other end. A mechanism is provided between the outer tube and the plug for aligning the first cord insertion holes of the outer tube with the second cord insertion hole of the slide. And another mechanism is provided between the outer tube and the plug for holding the plug in place so as to provide a resiliently urging mechanism by which the slide is resiliently urged upwardly in the outer tube.

The aligning mechanism and holding mechanism are in the following preferable form.

The aligning mechanism and the holding mechanism include: a number of guide grooves extending vertically in an inside surface of the tube wall of the outer tube from a lower end thereof, each of some of the guide grooves having an aligning engagement portion at its lower end and each of the remaining guide grooves having a holding engagement portion at its upper end; and a number of parallel extending locking strips of the plug, each of some of the locking strips having at its upper end an aligning projection engageable with the respective aligning engagement portion and at its base a first holding projection engageable with said aligning engagement portion, and each of the remaining locking strips having at its upper end a second holding projection engageable with the respective holding engagement portion.

The resiliently urging mechanism is in the following preferable form.

The resiliently urging mechanism includes: a pair of resilient legs extending from a lower end of the stem of the slide; and a cam surface extending as an inside surface of a hollow of an insertion portion of the plug, the cam surface having a frustoconical shape tapering toward a bottom of the hollow of the plug and being frictionally engageable with the resilient legs.

In the aforesaid cord retainer, since the cord insertion holes of both the slide and the outer tube are in alignment with one another when the cord retainer is temporarily assembled, the cord can be inserted through the slide and the outer tube smoothly, whereupon the plug is forced into the outer tube until the first holding projections of the plug come into engagement with the corresponding aligning engagement portions of the outer tube and at the same time, until the second holding projections of the plug come into engagement with the corresponding holding engagement portions of the outer tube. Thus the outer tube and the plug are joined together. In this posture, the slide is resiliently urged upwardly in the outer tube as the resilient legs of the slide are frictionally pressed against the cam surface of the plug. As a result, the cord insertion hole of the slide is displaced from the cord insertion holes of the outer tube so as to retain the cord.

For adjustment of the inserted cord, the head of the slide is only pressed down against the resiliency of the legs until the cord insertion holes of both the slide and the outer tube come into alignment with one another.

Alternatively, the resiliently urging machanism may include: a frustoconical cam surface extending as an extension of the stem of the slide; and a number of resilient strips of the plug situated one between each adjacent pair of the locking strips, each of the resilient strips having an inwardly curved end frictionally engageable with the cam surface.

With this resiliently urging mechanism, when the cord is inserted through the cord retainer with the slide in the aligned position, the plug is forced into the outer tube until the holding projections come into engagement with the aligning engagement portions and the holding engagement portions, thus joining the outer tube and the plug together. As a result, the slide is urged upwardly in the outer tube under the resiliency of the resilient strips of the plug to retain the cord. For adjustment of the cord, the head of the slide is only pressed down.

Another type of the aligning mechanism and holding mechanism are in the following preferable form.

The aligning mechanism and the holding mechanism include: a number of guide grooves extending vertically in an inside surface of the tube wall of the outer tube from a lower end thereof, each of the guide grooves having at its lower end an aligning engagement portion; and a number of parallel extending locking strips of the plug, each of the locking strips having at its upper end an aligning projection eagageable with the respective aligning engagement portion and at its base a holding projection engageable with said aligning engagement portion.

In the cord retainer having these mechanism, the cord is inserted through the cord retainer with the slide in the aligned position, and then the plug is forced into the outer tube until the holding projections come into engagement with the corresponding aligning engagement portions, thus joining the outer tube and the plug together. As a result, the slide is urged upwardly in the outer tube under the resiliency of the legs to retain the cord. For adjustment of the cord, the head of the slide is only pressed down.

Still another preferable form of the aligning mechanism and the holding mechanism include: a number of guide grooves extending vertically in an inside surface of the tube wall of the outer tube from a lower end thereof, each of the guide grooves having at its lower end an aligning engagement portion and at its upper end a holding engagement portion; and a number of parallel extending locking strips of the plug, each of the locking strips having at its upper end a holding projection engageable selectively with the aligning engagement portion and the holding engagement portion.

And in still another preferable form of the resiliently urging mechanism, a coil spring is situated between a lower end of the stem of the slide and the bottom of the hollow of the plug.

In the cord retainer with the resiliently urging mechanism as above, the cord is inserted through the cord retainer with the slide in the aligned position, and then the plug is forced into the outer tube against the resiliency of the coil spring until the holding projections come into engagement with the corresponding holding engagement portions, to join the outer tube and the plug together. In this posture, the slide is urged upwardly in the outer tube under the resiliency of the coil spring to retain the cord. For adjustment of the cord, the head of the slide is only pressed down.

Additionally, in the cord retainer, a stop is situated between the slide and the outer tube for preventing the slide from being removed from the outer tube. In an alternative form, a stop may be situated between the slide and the plug for preventing the slide from being removed from the plug.

DETAILED DESCRIPTION OF THE PREFERRED EMBODIMENTS

Figure 1:
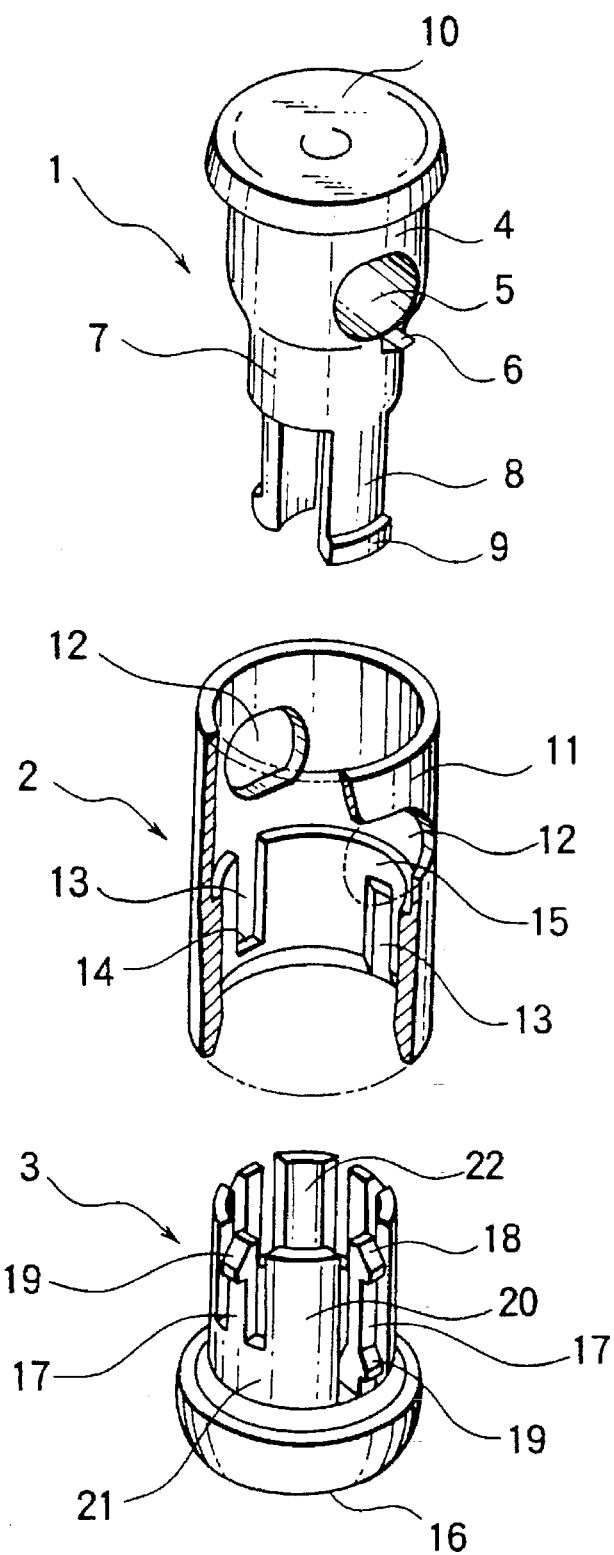
FIG. 1 is an exploded perspective view of a cord retainer according to a first embodiment of this invention.

Various preferred embodiments of a cord retainer according to this invention will now be described in detail with reference to the accompanying drawings.

The cord retainer of this invention generally comprises a slide 1, an outer tube 2 and a plug 3, which are molded of synthetic resin, e.g., polyamide, polyacetal or polypropylene by integrally molding means.

FIGS. 1 through 4 show a cord retainer according to a first embodiment. In the first embodiment, the slide 1 has in a cylindrical stem 4 a cord insertion hole 5 through which a cord A is to be horizontally inserted. The slide 1 further has a stop 6 projecting from the stem 4 at a lower side of the cord insertion hole 5. The lower part of the stem 4 is reduced in diameter as a minor-diameter stem portion 7. The slide 1 is slidable with respect to the outer tube 2 and the plug 3. Further, the slide 1 has a pair of resilient legs 8 projecting downwardly from the minor-diameter stem portion 7 and terminating each in an outwardly directed protuberance 9 frictionally engageable with the plug 3. The upper end of the stem 4 is expanded in diameter as a head 10 to be pressed for cord adjustment.

The outer tube 2 is in the form of a cylindrical tube into which the slide 1 and the plug 3 are to be inserted from the upper end and the lower end, respectively. The outer tube 2 has in the upper part of a tube wall 11 a pair of cord insertion holes 12 corresponding to the cord insertion hole 5 of the slide 1 and in an inside surface of the lower part of the tube wall 11 a number of guide grooves 13 extending vertically from the lower end of the tube wall 11. Some of the guide grooves 13 have each at its lower end an aligning engagement portion 14, while the remaining guide grooves 13 have each a holding engagement portion 15 at a position higher than the aligning engagement portion 14. Preferably the outer tube 2 has a larger thickness at a region where the guide grooves 13 are formed, so that the aligning and holding engagement portions 14, 15 can be engaged by corresponding members described below.

Figure 2:
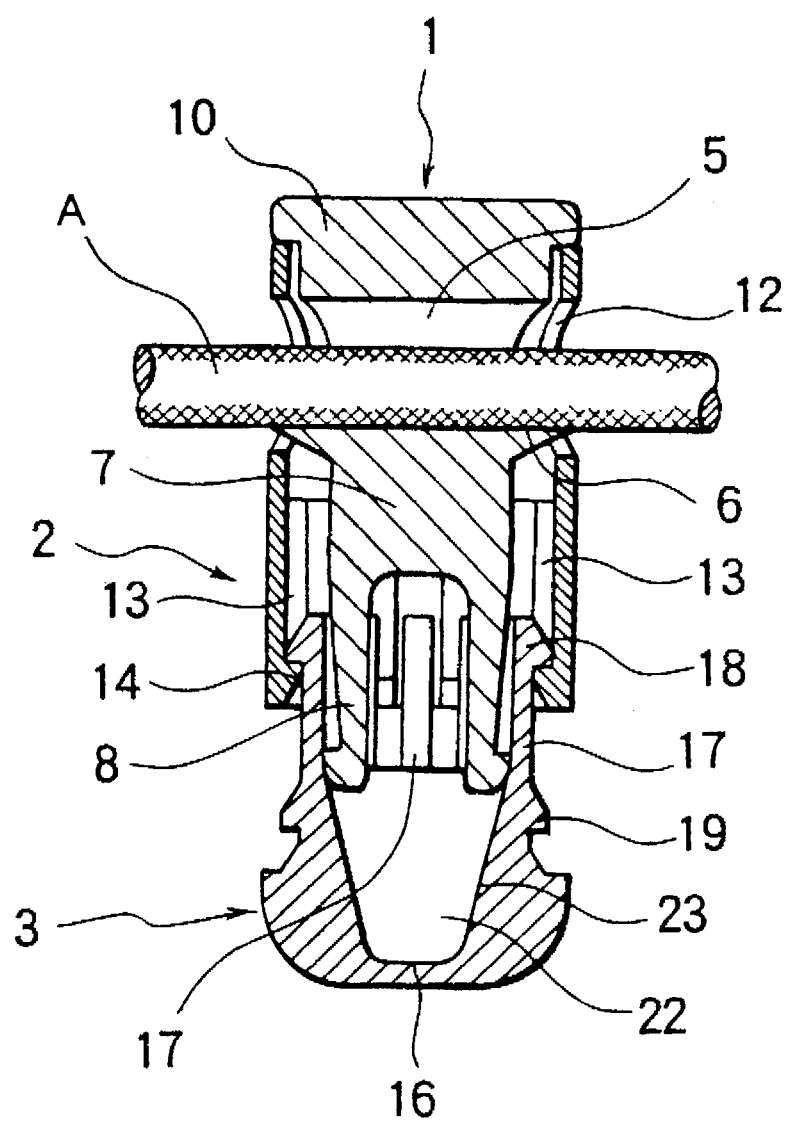
FIG. 2 is a vertical cross-sectional view, as viewed from the front side, of the cord retainer of FIG. 1, showing its temporarily assembled position.
Figure 3:
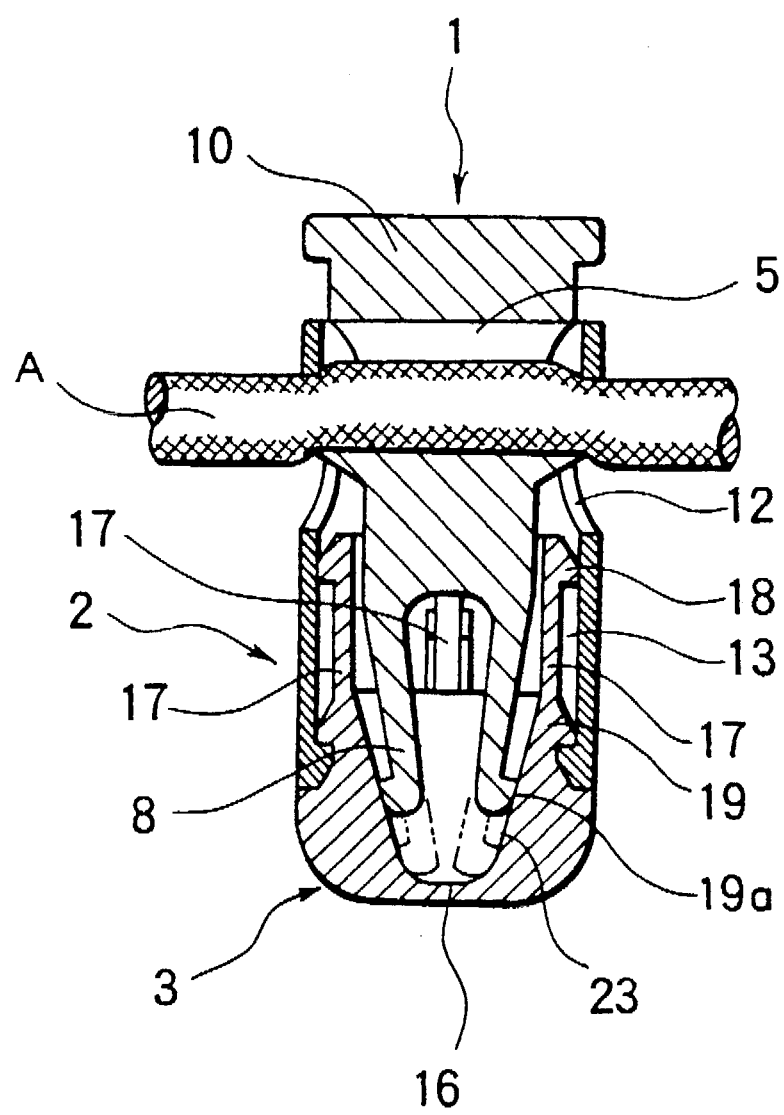
FIG. 3 is a vertical cross-sectional view similar to FIG. 2, but showing the cord retainer in the cord retaining position.
Figure 4:
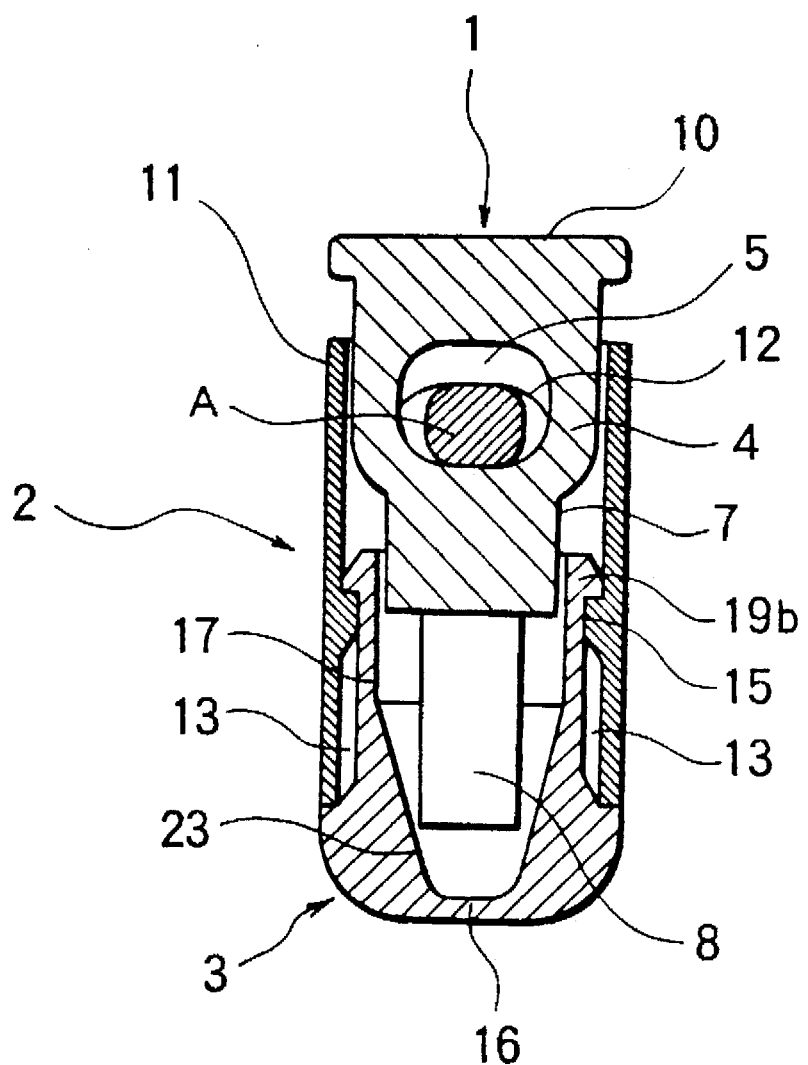
FIG. 4 is a vertical cross-sectional view similar to FIG. 3, but as viewed from the side.

The plug 3 is in the form of a tube with one end closed as a bottom 16 and has a number of parallel locking strips 17 extending upwardly from the bottom 16. Some of the locking strips 17 have each at its upper end an outwardly directed aligning projection 18 enageable with the corresponding aligning engagement portion 14, which is formed at the lower end of the respective guide groove 13, and at its base an outwardly directed first holding projection 19a engageable with the corresponding aligning engagement portion 14, while the remaining locking strips 17 have each at its upper end a second holding projection 19b engageable with the corresponding holding engagement portion 15, which is formed at the upper end of the respective guide groove 13. The plug 3 has a tubular insertion portion 21 in which the locking strips 17 extend and which is to be fitted in the outer tube 2. Further, the plug 3 has a number of guide strips 20 extending in the insertion portion 21 and situated one between each adjacent pair of locking strips 17. The insertion portion 21 has on the lower part of its hollow 22 a frustoconical cam surface 23 tapering toward the bottom 16, as shown in FIGS. 2, 3 and 4, and frictionally engageable with the protuberances 9 of the legs 8.

In use, firstly the insertion portion 21 of the plug 3 is inserted into the outer tube 2 from the lower end to be assembled, during which the aligning projections 18 of the locking strips 17 are positioned in radial alignment with the corresponding aligning engagement portions 14 at the ends of the guide grooves 13 of the outer tube 2 while the second holding projections 19b at the upper ends of the locking strips 17 are positioned in radial alignment with the corresponding guide grooves 13, which have the holding engagement portions 15. Then the resilient legs 8 of the slide 1 are inserted into the outer tube 2 from the upper end in such a manner that the stop 6 projecting from the stem 4 at the lower side of the cord insertion hole 5 is received in the cord insertion holes 12 of the outer tube 2. Thus the cord retainer is assembled with the slide 1 assuming the aligned position, in which the cord insertion holes 5, 12 of both the slide 1 and the outer tube 2 are aligned with one another. After completion of this assembling, it is possible to align the cord insertion holes 5, 12 with one another without any resilient deformation of the legs 8 of the slide 1 which might be caused by the plug 3.

Figure 5:
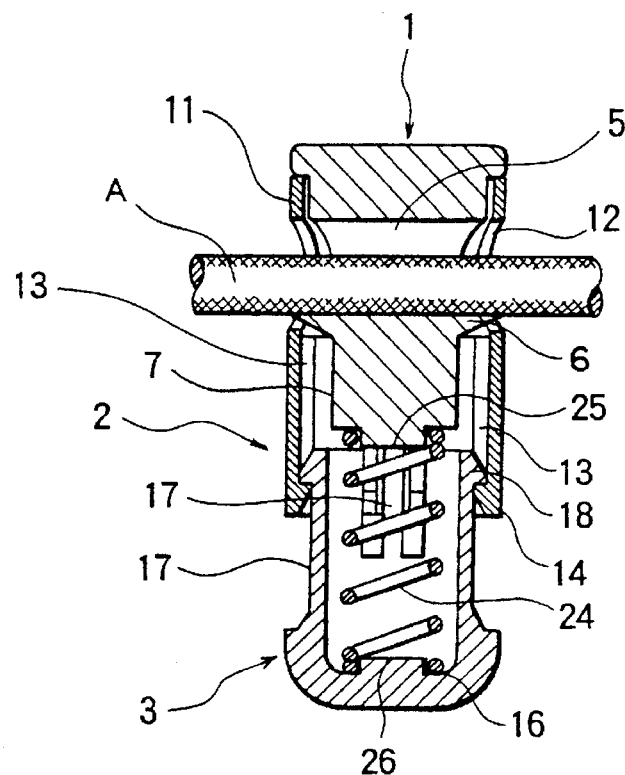
FIG. 5 is a vertical cross-sectional view of a cord retainer according to a second embodiment, showing its temporarily assembled position.
Figure 6:
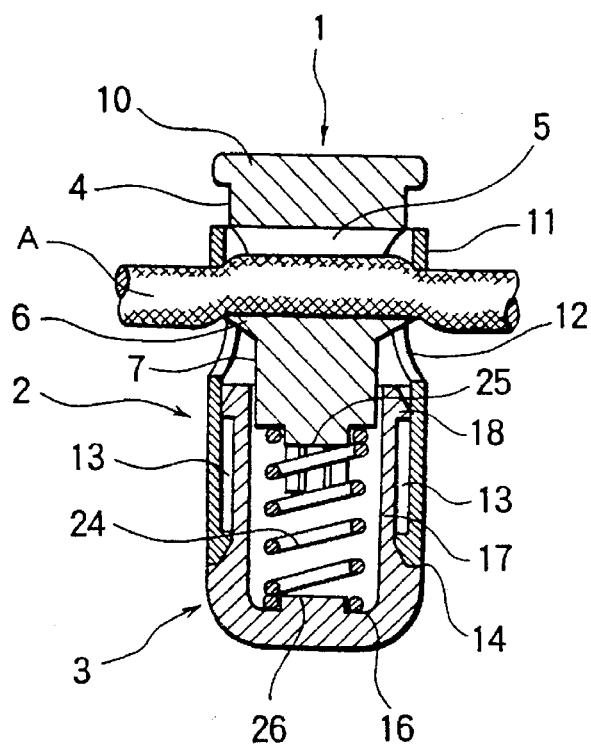
FIG. 6 is a vertical cross-sectional view similar to FIG. 5, but showing the cord retainer in the cord retaining position.
Figure 7:
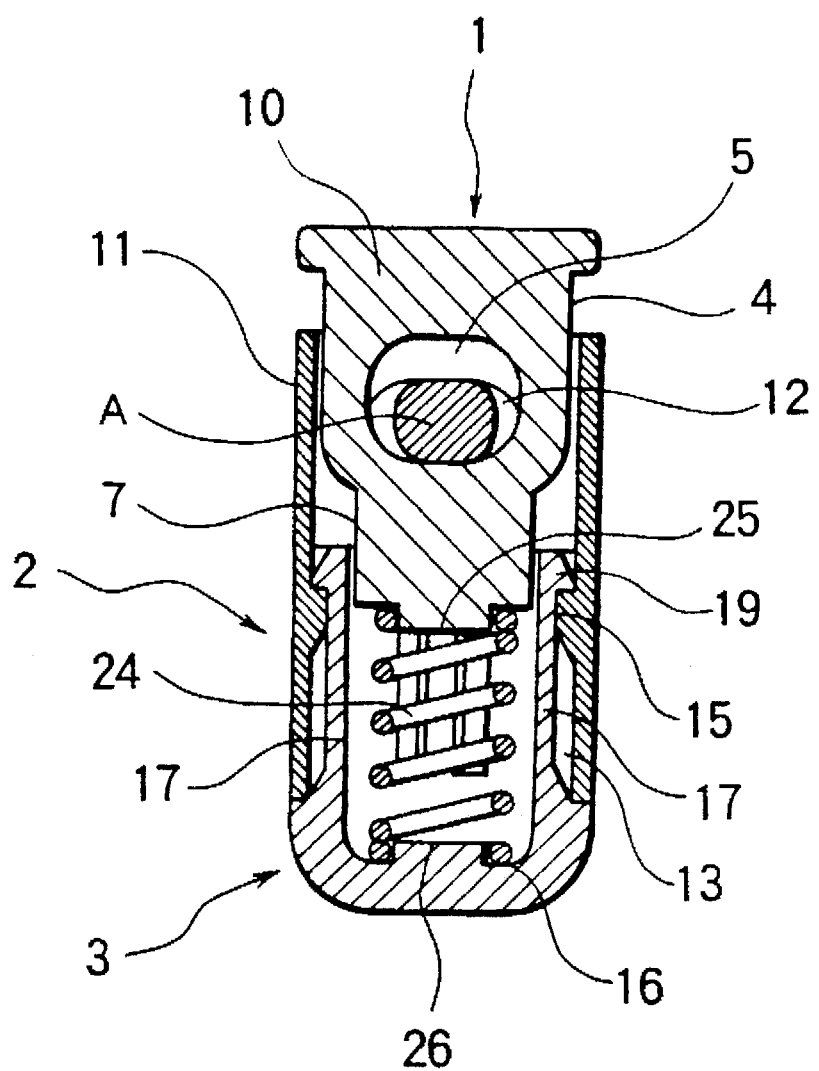
FIG. 7 is a vertical cross-sectional view similar to FIG. 7, but as viewed from the side.

FIGS. 5 through 7 show a cord retainer according to a second embodiment. The cord retainer comprises a slide 1, an outer tube 2, a plug 3 all of which are made of synthetic resin and a metallic coil spring 24. The slide 1 has in a cylindrical stem 4 a horizontal cord insertion hole 5 through which a cord A is to be inserted. The slide 1 further has a stop 6 projecting from the stem 4 at a position near the lower side of the cord insertion hole 5. The lower part of the stem 4 is reduced in diameter as a minor-diameter stem portion 7 and hence is slidable with respect to the outer tube 2 and the plug 3. Further, the slide 1 has on the under surface of the minor-diameter stem portion 7 a central rise 25 to which one end of the coil spring 24 is fitted. The upper end of the stem 4 is enlarged in diameter as a head 10.

The outer tube 2 is in the form of a cylindrical tube into which the slide 1 and the plug 3 are to be inserted from the upper end and the lower end, respectively. The outer tube 2 has in the upper part of a tube wall 11 a pair of cord insertion holes 12 corresponding to the cord insertion hole 5 of the slide 1 and in an inside surface of the lower part of the tube wall 11 a number of guide grooves 13 extending vertically from the lower end of the tube wall 11. Some of the guide grooves 13 have each at its lower end an aligning engagement portion 14, while each of the remaining guide grooves 13 has a holding engagement portion 15 at a position higher than said aligning engagement portion. Likewise the previous embodiment, the outer tube 2 has a larger thickness at a region where the guide grooves 13 are formed, so that the aligning and holding engagement portions 14, 15 can be provided.

The plug 3 is in the form of a tube with one end closed as a bottom 16 and has a number of parallel locking strips 17 extending upwardly from the bottom 16. Some of the locking strips 17 have each at its end a holding projection 19 enageable with the corresponding holding engagement portion 15, as shown in FIG. 7, which is formed at the upper end of the respective guide groove 13, while the remaining locking strips 17 have each at its upper end an aligning projection 18 engageable with the corresponding aligning engagement portion 14 as shown in FIG. 5, which is formed at the lower end of the respective guide groove 13. The plug 3 has a tubular insertion portion 21 from which the locking strips 17 extend and which is to be fitted in the outer tube 2. Further, the plug 3 has a number of guide strips 20 extending in the insertion portion 21 and situated one between each adjacent pair of locking strips 17. Furthermore, the plug 3 has on the inside surface of the bottom 16 a central rise 26 to which the other end of the coil spring 24 is fitted. Alternatively, likewise the previous embodiment, the locking strips may have each at its base a holding projection.

In use, likewise the previous embodiment, firstly the insertion portion 21 of the plug 3 is inserted into the outer tube 2 from the lower end, during which the aligning projections 18 at the upper ends of the locking strips 17 are positioned in radial alignment with the aligning engagement portions of the outer tube 2 for assembling. Then the slide 1, with the coil spring 24 connected at one end to the central rise 25 of the minor-diameter stem portion 7, is inserted into the outer tube 2 from the upper end and, at the same time, the other end of the coil spring 24 is fitted to the central rise 26 of the plug 3. Thus the cord retainer is assembled with the slide 1 in the aligned position, in which the cord insertion holes 5, 12 of both the slide 1 and the outer tube 2 are aligned with one another so that the cord A can be inserted through the slide 1 and the outer tube 2 smoothly.

Figure 8:
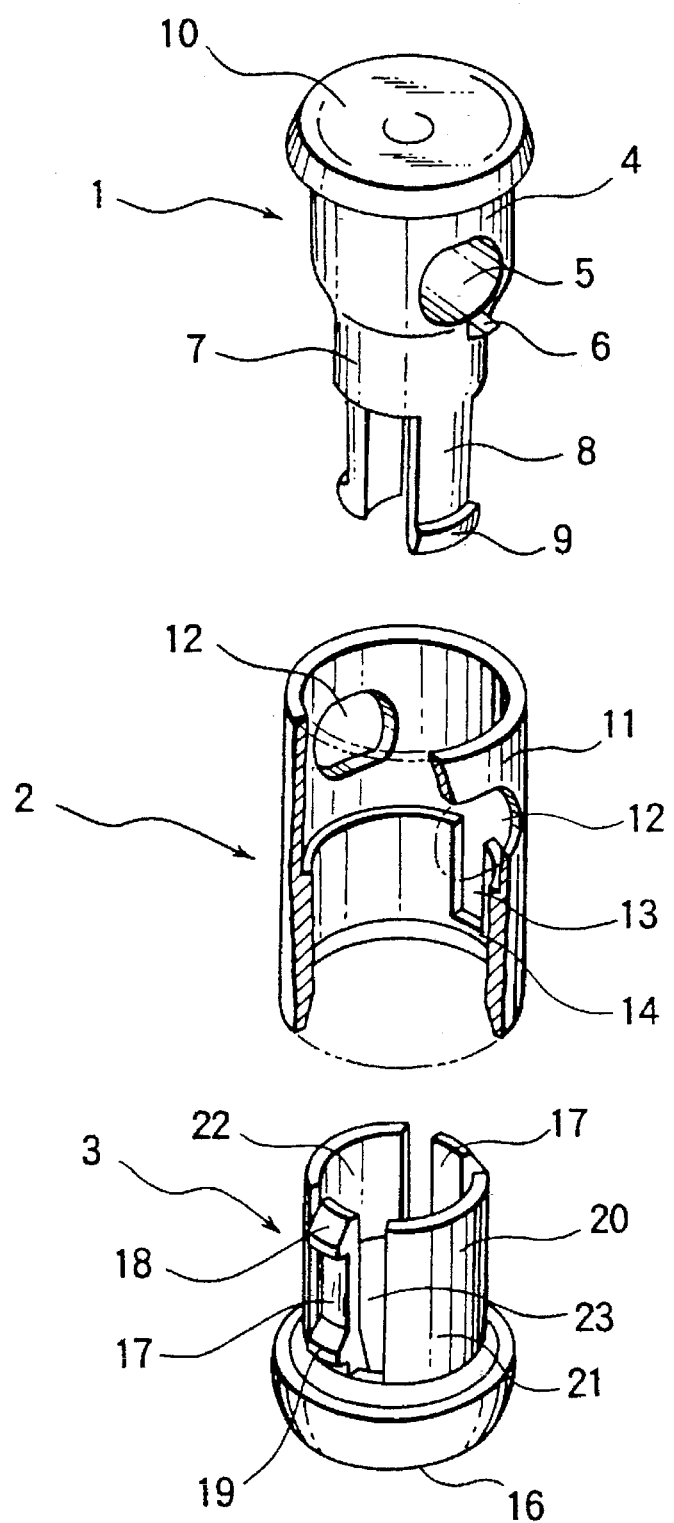
FIG. 8 is an exploded perspective view of a cord retainer according to a fourth embodiment.

FIG. 8 shows a cord retainer according to a third embodiment. The cord retainer of this embodiment, like the first embodiment, comprises a slide 1, an outer tube 2 and a plug 3, all made of synthetic resin. The slide 1 has in a cylindrical stem 4 a horizontal cord insertion hole 5 through which a cord A is to be inserted. The slide 1 further has a stop 6 projecting from the stem 4 at the lower side of the cord insertion hole 5. The lower part of the stem 4 is reduced in diameter as a minor-diameter stem portion 7 and hence is slidable with respect to the outer tube 2 and the plug 3. Further, the slide 1 has a pair of resilient legs 8 each extending downwardly from the minor-diameter stem portion 7 and terminating in a protuberance 9. The upper end of the stem 4 is enlarged in diameter as a head 10.

The outer tube 2 is in the form of a cylindrical tube. The outer tube 2 has in the upper part of a tube wall 11 a pair of cord insertion holes 12 corresponding to the cord insertion hole 5 of the slide 1 and in an inside surface of the lower part of the tube wall 11 a pair of guide grooves 13 extending vertically from the lower end of the tube wall 11 and having each at its lower end an aligning engagement portion 14. The outer tube 2 has an increased thickness at a region where the guide grooves 13 are formed, so that the aligning engagement portions 14 can be provided. The number of guide grooves 13 may be increased as desired.

The plug 3 is in the form of a tube with one end closed as a bottom 16 and has a pair of parallel locking strips 17 extending upwardly from the bottom 16, and each having at its upper end an aligning projection 18 enageable with the corresponding aligning engagement portion 14 and at its base a holding projection 19 engageable with the aligning engagement portion 14. The plug 3 has a tubular insertion portion 21 in which the locking strips 17 extend and which is to be fitted in the outer tube 2. Further, the plug 3 has a pair of guide strips 20 extending in the insertion portion 21 and situated one between each adjacent pair of locking strips 17. Furthermore, the plug 3 has on an inside surface of the hollow 22 of the insertion portion 21 a frustoconical cam surface 23 tapering toward the bottom 16 and frictionally engageable with the protuberances 9 of the legs 8. The number of locking strips 17 may be increased as desired.

In this embodiment, like the foregoing embodiments, the insertion portion 21 of the plug 3 is inserted into the outer tube 2 from the lower end, with the locking strips 17 positioned in radial alignment with the guide grooves 13, until the aligning projections 18 engage the aligning engagement portions 14. Then the legs 8 of the slide 1 is inserted into the outer tube 2 from the upper end until the stop 6 projecting from the stem 4 is received in the cord insertion holes 12 of the outer tube 2. Thus the cord retainer is assembled with the slide 1 in the aligned position, in which the cord insertion holes 5, 12 of both the slide 1 and the outer tube 2 are aligned with one another.

Figure 9:
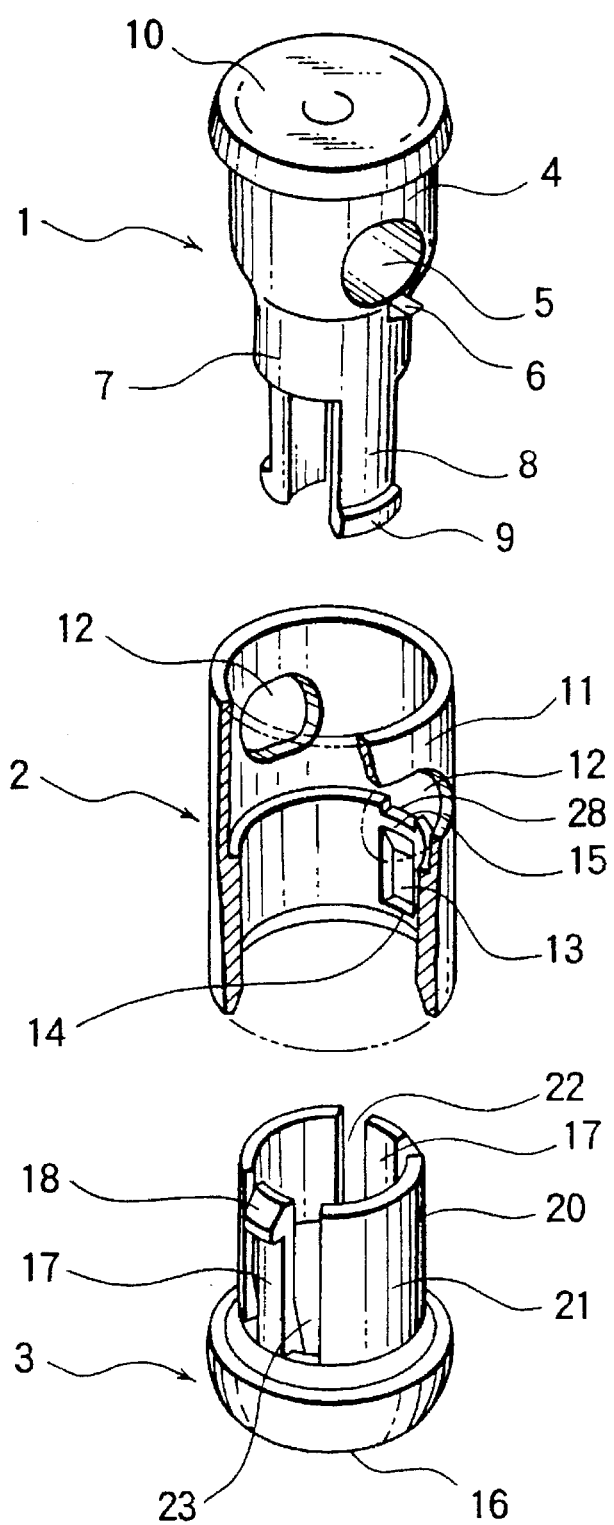
FIG. 9 is an exploded perspective view of a cord retainer according to a fourth embodiment.

FIG. 9 shows a cord retainer according to a fourth embodiment. The cord retainer of this embodiment, like the previous embodiment, comprises a slide 1, an outer tube 2 and a plug 3, all made of synthetic resin. The slide 1 has in a cylindrical stem 4 a horizontal cord insertion hole 5. The slide 1 further has a stop 6 projecting from the stem 4 at the lower side of the cord insertion hole 5. The lower part of the stem 4 is reduced in diameter as a minor-diameter stem portion 7 and hence is slidable with respect to the outer tube 2 and the plug 3. Further, the slide 1 has a pair of resilient legs 8 each extending downwardly from the minor-diameter stem portion 7 and terminating in a protuberance 9. The upper end of the stem 4 is enlarged in diameter as a head 10.

The outer tube 2 is in the form of a cylindrical tube. The outer tube 2 has in the upper part of a tube wall 11 a pair of cord insertion holes 12 corresponding to the cord insertion hole 5 of the slide 1 and in an inside surface of the lower part of the tube wall 11 a pair of guide grooves 13 extending vertically from the lower end of the tube wall 11 and having each at its lower end an aligning engagement portion 14 and its upper end a holding engagement portion 15. The outer tube 2 has an increased thickness at a region where the guide grooves 13 are formed, and a recess 28 is formed on top of the holding engagement portion 15 so that the plug 3 is prevented from moving radially after assembling. The number of guide grooves 13 may be increased as desired.

The plug 3 is in the form of a tube with one end closed as a bottom 16 and has a pair of parallel locking strips 17 extending upwardly from the bottom 16 and each having at its upper end an aligning projection 18 enageable selectively with the aligning engagement portion 14 and the holding engagement portion 15 of the corresponding guide groove 13. The plug 3 has a tubular insertion portion 21 in which the locking strips 17 extend and which is to be fitted in the outer tube 2. Further, the plug 3 has a pair of guide strips 20 extending in the insertion portion 21 and situated one between each adjacent pair of locking strips 17. Furthermore, the plug 3 has on an inside surface of the hollow 22 of the insertion portion 21 a frustoconical cam surface 23 tapering toward the bottom 16 and frictionally engageable with the protuberances 9 of the legs 8. The number of locking strips 17 may be increased as desired.

In this embodiment, like the foregoing embodiments, the insertion portion 21 of the plug 3 is inserted into the outer tube 2 from the lower end, with the locking strips 17 positioned in radial alignment with the guide grooves 13, until the aligning projections 18 engage the aligning engagement portions 14 for assembling. Then the legs 8 of the slide 1 is inserted into the outer tube 2 from the upper end until the stop 6 projecting from the stem 4 is received in the cord insertion holes 12 of the outer tube 2. Thus the cord retainer is assembled with the slide 1 in the aligned position, in which the cord insertion holes 5, 12 of both the slide 1 and the outer tube 2 are aligned with one another.

Figure 10:
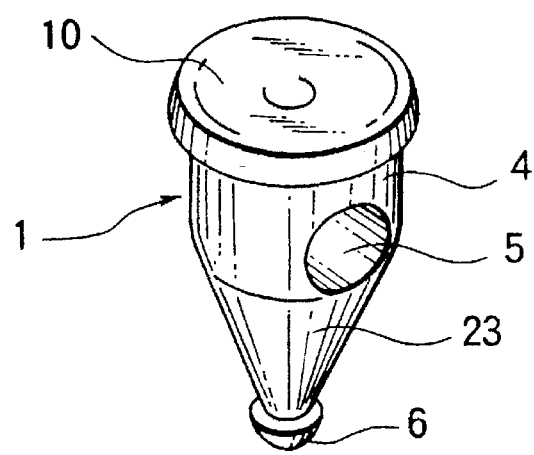
FIG. 10 is an exploded perspective view of a cord retainer according to a fifth embodiment.
Figure 10:
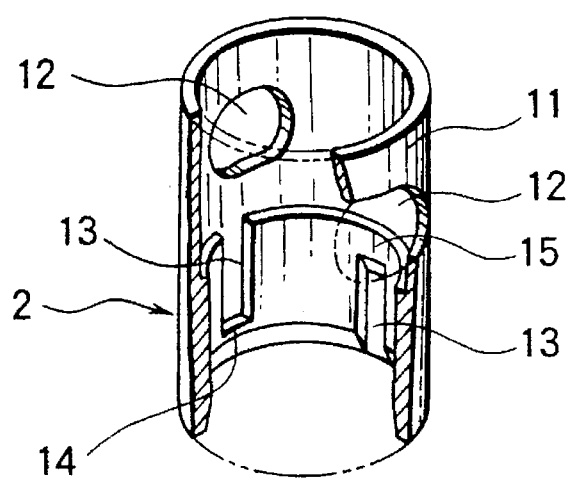
Figure 10:
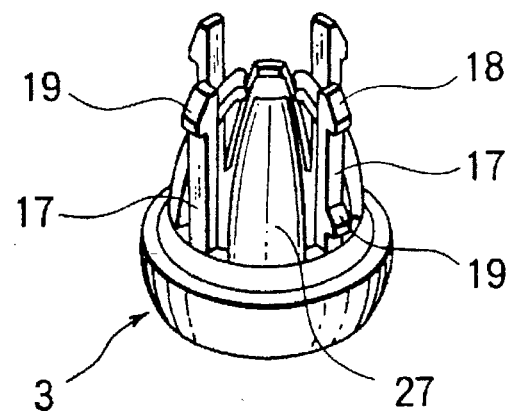
Figure 11:
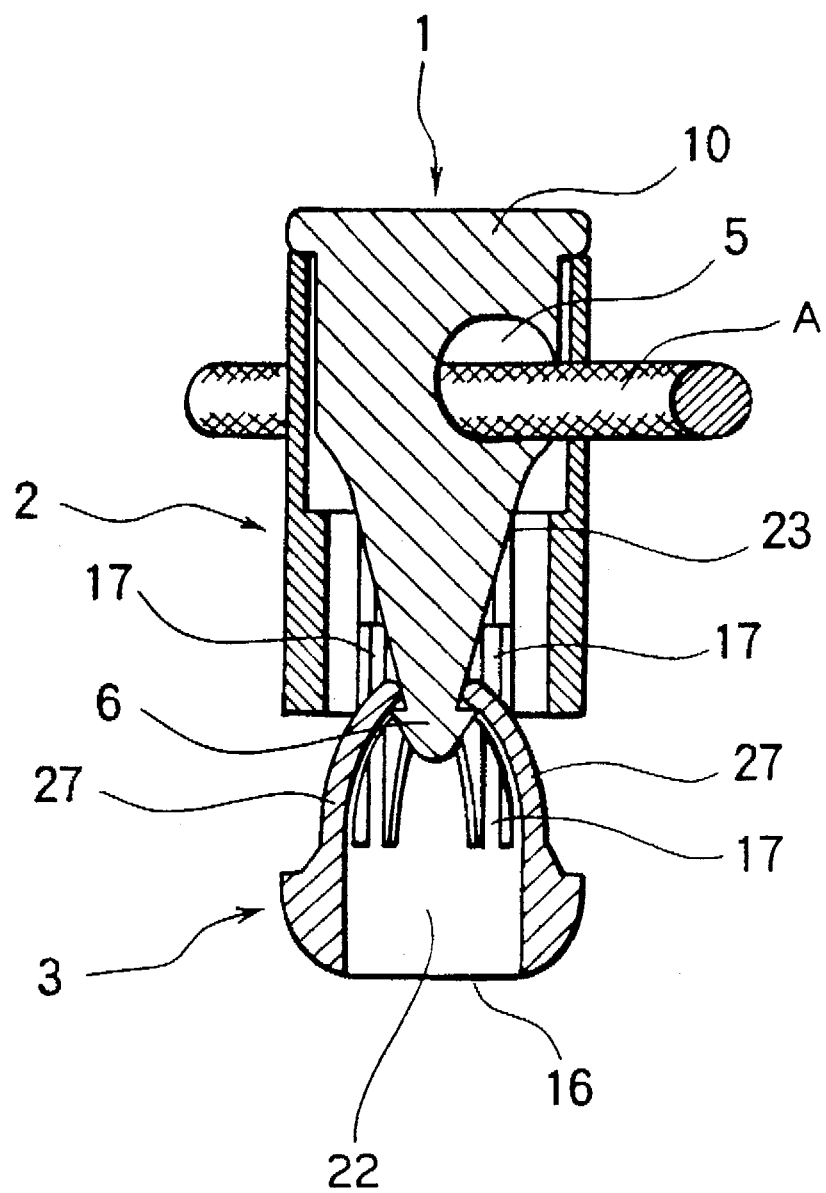
FIG. 11 is a vertical cross-sectional view of the cord retainer of FIG. 10, showing its temporarily assembled position.
Figure 12:
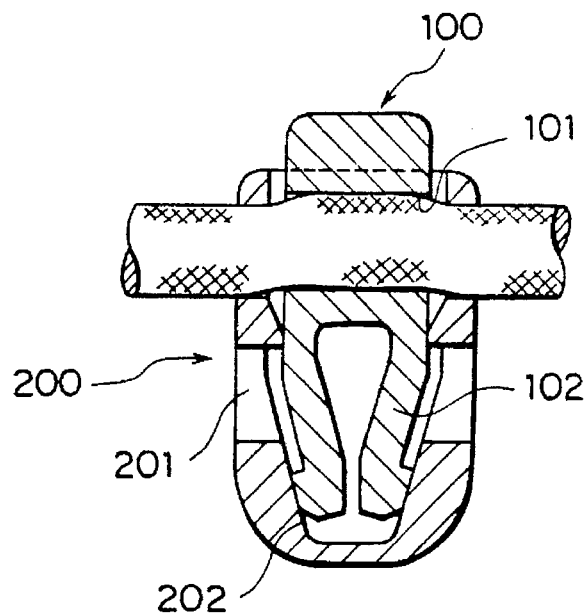
FIG. 12 is a vertical cross-sectional view, as viewed from the front side, of a conventional cord retainer, showing the cord retainer in the cord retaining position.
Figure 13:
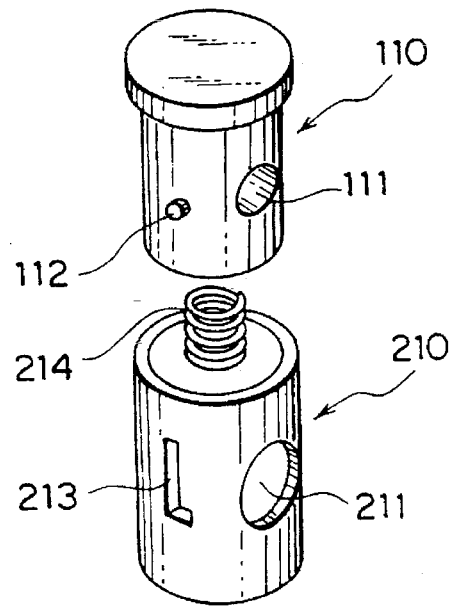
FIG. 13 an exploded perspective view of another conventional cord retainer.
Figure 14:
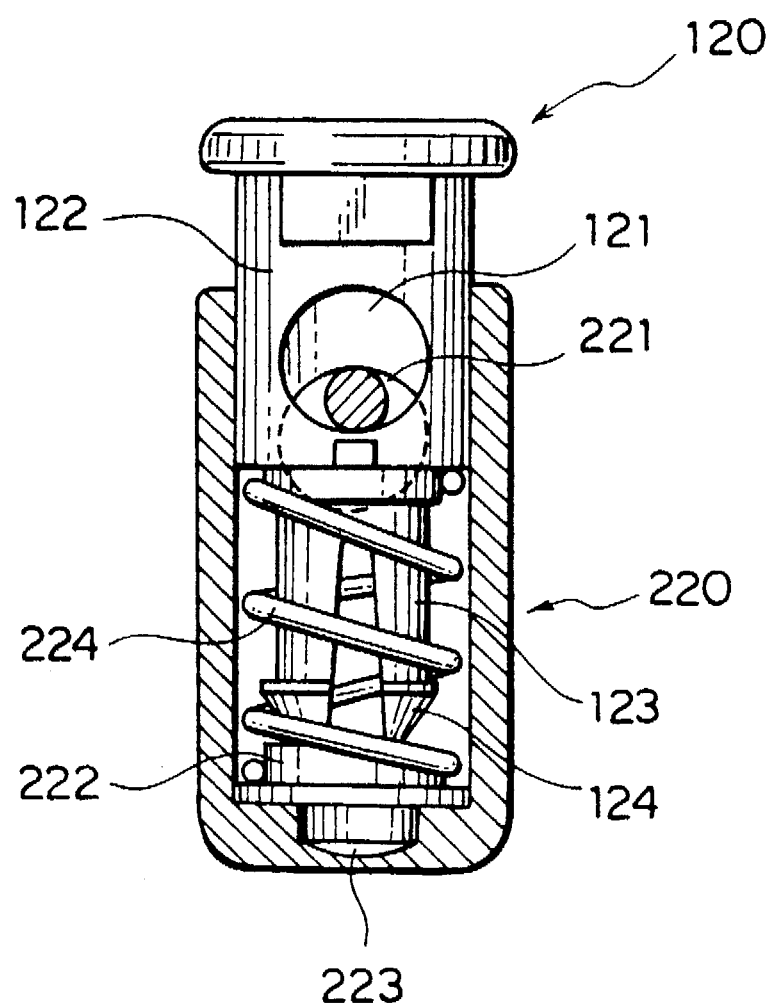
FIG. 14 is a side view, partly in cross section, of still another conventional cord retainer, showing the cord retainer in the cord retaining position.

FIGS. 10 and 11 show a cord retainer according to a fifth embodiment. The cord retainer of this embodiment, like the first embodiment, comprises a slide 1, an outer tube 2 and a plug 3, all made of synthetic resin. This embodiment is similar to the first embodiment except for resiliently urging mechanism between the slide 1 and the plug 3. The slide 1 has in a cylindrical stem 4 a horizontal cord insertion hole 5. The lower part of the stem 4 is tapered so as to have a frustoconical cam surface 23, terminating in a protuberance as a stop 6. The upper end of the stem 4 is enlarged in diameter as a head 10.

The outer tube 2 is in the form of a cylindrical tube. The outer tube 2 has in the upper part of a tube wall 11 a pair of cord insertion holes 12 corresponding to the cord insertion hole 5 of the slide 1 and in an inside surface of the lower part of the tube wall 11 two pairs of guide grooves 13 extending vertically from the lower end of the tube wall 11. One pair of the guide grooves 13 has each at its lower end an aligning engagement portion 14, while the other pair of the guide grooves 13 has each at its upper end a holding engagement portion 15. The outer tube 2 has an increased thickness at a region where the guide grooves 13 are formed. The number of guide grooves 13 may be increased as desired.

The plug 3 is in the form of a tube with one end closed as a bottom 16 or not closed, and has two pairs of parallel locking strips 17 extending upwardly from the bottom 16; one pair of the locking strips 17 has each at its upper end an aligning projection 18 each engageable with the corresponding aligning engagement portion 14 and at its base a first holding projection 19a engageable with the same aligning engagement portion 14, while the other pair of the locking strips 17 has each at its upper end a second holding projection 19b engageable with the corresponding holding engagement portion 15. The plug 3 has a tubular insertion portion 21 in which the locking strips 17 extend and which is to be fitted in the outer tube 2. Further, the plug 3 has four resilient strips 27 extending in the insertion portion 21 and situated one between each adjacent pair of locking strips 17, each resilient strip 27 terminating in an inwardly curved end frictionally engageable with the cam surface 23 of the slide 1. The number of locking strips 17 may be increased as desired.

In this embodiment, the plug 3 is inserted into the outer tube 2 from the lower end, in such a manner that one pair of locking strips 17, each having both the aligning projection 18 and the holding projection 19a, are positioned in radial alignment with one pair of guide grooves 13 having the aligning engagement portion 14 at their lower end and that the other pair of locking strips 17, each having only the second holding projection 19b, are positioned in radial alignment with the other pair of guide grooves 13 having the holding engagement portions 15 at their upper ends, until the aligning projections 18 engage the aligning engagement portions 14. Then the frustoconical cam surface 23 of the stem 4 of the slide 1 is inserted into the outer tube 2 from the upper end until the stop 6 formed at the peak of the frustoconical part of the stem 4 comes into engagement with the resilient strips 27 of the plug 3. Thus the cord retainer is assembled with the slide 1 in the aligned position, in which the cord insertion holes 5, 12 of both the slide 1 and the outer tube 2 are aligned with one another.

The cord retainer of this invention has the following advantageous results:

With the cord retainer, partly since the slide 1 and the plug 3 are inserted into the outer tube 2 from opposite ends and partly since the aligning mechanism is situated between the outer tube 2 and plug 3 to align the cord insertion holes 5, 12 of both the slide 1 and the outer tube 2 with one another, it is possible to assemble the cord retainer in a simple operation and also to hold the slide 1 surely in the aligned position so that the cord can be inserted through the slide 1 and the outer tube 2 smoothly. Further, since the holding mechanism is situated between the outer tube 2 and the plug 3 to provide a resiliently urging mechanism which resiliently urges the slide 1 upwardly in the outer tube 2, it is possible to shift the slide 1 from the aligned position to the cord retaining position in a simple action. Furthermore, since such resiliently urging mechanism will not be demonstrated until the the plug 3 is forced all the way into the outer tube 2, it is possible to keep the slide 1 reliably in the aligned position.

According to a preferred form of the aligning and holding mechanism, since some of a number of guide grooves 13 formed in the outer tube 2 have each at its lower end an aligning engagement portion 14 and the remaining guide grooves 13 have each at its upper end a holding engagement portion 15, and some of a number of locking strips 17 of the plug 3 have each at its upper end an aligning projection 18 and at its base a holding projection 19, it is possible to join the outer tube and the plugs 3 together firmly in a good balance.

According to another preferred form of the aligning and holding mechanisms, partly since the guide grooves 13 formed in the outer tube 2 have each only at its lower end an aligning engagement portion 14, or the guide grooves 13 have each at its lower end an aligning engagement portion 14 and at its upper end a holding engagement portion 15, and partly since the locking strips 17 of the plug 3 have each at its upper end an aligning projection 18 and at its base a holding projection 19, it is possible to realize a simple structure for the aligning and holding mechanism which structure is particularly suitable for being molded of synthetic resin by injection molding.

In order to provide the resiliently urging mechanism to the slide 1, the slide 1 has at its lower part a number of resilient legs 8 and the plug 3 has in the inside surface of its bottom 16 a frustoconical cam surface 23 frictionally engageable with the resilient legs 8, so that it is possible to realize a simple structure for the holding mechanism which structure can be made of synthetic resin. According to another preferred form of the resiliently urging mechanism, since a coil spring 24 is merely situated between the slide 1 and the plug 3, it is possible to assemble the cord retainer in a very simple operation.

According to still another preferred form of the resiliently urging mechanism, partly since the slide 1 has on its lower part a frustoconical cam surface 23 and partly since the plug 3 has a number of resilient strips 27 each having an inwardly curved end frictionally engageable with the cam surface 23, it is possible to transmit a uniform resilient force to the slide 1 as the resilient strips 27 deform in a good balance.

According to an additional feature of the cord retainer of this invention, since a stop 6 is situated between the slide 1 and the outer tube 2 for preventing the slide 1 from being removed from the outer tube 2, the slide 1 is free from any inadvertent removal even while the cord is not inserted through the slide 1 and the outer tube 2.

What is claimed is:

1. A cord retainer comprising:
   (a) an outer tube having a pair of first cord insertion holes in a tube wall;
   (b) a slide having a stem portion to be slidably inserted in said outer tube from one end, said stem portion having a second cord insertion hole;
   (c) a plug having an insertion portion to be inserted in said outer tube from the other end;
   (d) mechanism provided between said outer tube and said plug for aligning said first cord insertion holes of said outer tube with said second cord insertion hole of said slide; and
   (e) mechanism provided between said outer tube and said plug for selectively holding said plug in a first position wherein said first cord insertion holes of said outer tube are aligned with said second cord insertion hole of said slide, and in a second position so as to provide a resiliently urging mechanism by which said slide is resiliently urged upwardly in said outer tube.

2. A cord retainer according to claim 1, further comprising a stop situated between said slide and said outer tube for preventing said slide from being removed from said outer tube.

3. A cord retainer according to claim 1, further comprising a stop situated between said slide and said plug for preventing said slide from being removed from said plug.

4. A cord retainer according to claim 1, wherein said plug comprises a hollow of an insertion portion thereof, and wherein resiliently urging mechanism is a coil spring situated between a lower end of said stem of said slide and said bottom of said hollow of said hollow of said plug.

5. A cord retainer comprising:
   (a) an outer tube having a pair of first cord insertion holes in a tube wall;
   (b) a slide having a stem portion to be slidably inserted in said outer tube from one end, said stem portion having a second cord insertion hole;
   (c) a plug having an insertion portion to be inserted in said outer tube from the other end;
   (d) mechanism provided between said outer tube and said plug for aligning said first cord insertion holes of said outer tube with said second cord insertion hole of said slide; and
   (e) mechanism provided between said outer tube and said plug for holding said plug in place so as to provide a resiliently urging mechanism by which said slide is resiliently urged upwardly in said outer tube;
wherein said aligning mechanism and said holding mechanism include:
   a number of guide grooves extending vertically in an inside surface of said tube wall of said outer tube from a lower end thereof, each of same of said guide grooves having an aligning engagement portion at its lower end and each of the remaining guide grooves having a holding engagement portion at its upper end; and
   a number of parallel extending locking strips of said plug, each of some of said locking strips having at its upper end an aligning projection engageable with the respective aligning engagement portion and at its base a first holding projection engageable with said aligning engagement portion and each of the remaining locking strips having at its upper end a second holding projection engageable with the respective holding engagement portion.

6. A cord retainer according to claim 5, wherein said resiliently urging mechanism includes:
   a frustoconical cam surface extending as an extension of said stem of said slide; and
   a number of resilient strips of said plug situated one between each adjacent pair of said locking strips, each of said resilient strips having an inwardly curved end frictionally engageable with said cam surface.

7. A cord retainer according to claim 5, wherein said plug comprises a hollow of an insertion portion thereof, and Wherein resiliently urging mechanism is a coil spring situated between a lower end of said stem of said slide and said bottom of said hollow of said hollow of said plug.

8. A cord retainer comprising:
   (a) an outer tube having a pair of first cord insertion holes in a tube wall;
   (b) a slide having a stem portion to be slidably inserted in said outer tube from one end, said stem portion having a second cord insertion hole;
   (c) a plug having an insertion portion to be inserted in said outer tube from the other end;
   (d) mechanism provided between said outer tube and said plug for aligning said first cord insertion holes of said outer tube with said second cord insertion hole of said slide; and
   (e) mechanism provided between said outer tube and said plug for holding said plug in place so as to provide a resiliently urging mechanism by which said slide is resiliently urged upwardly in said outer tube;
wherein said aligning mechanism and said holding mechanism include:
   a number of guide grooves extending vertically in an inside surface of said tube wall of said outer tube from a lower end thereof, each of said guide grooves having at its lower end an aligning engagement portion; and
   a number of parallel extending locking strips of said plug, each of said locking strips having at its lower end an aligning projection engageable with the respective aligning engagement portion and at its base a holding projection engageable with said aligning engagement portion.

9. A cord retainer according to claim 8, wherein said plug comprises a hollow of an insertion portion thereof, and wherein resiliently urging mechanism is a coil spring situated between a lower end of said stem of said slide and said bottom of said hollow of said hollow of said plug.

10. A cord retainer comprising:
    (a) an outer tube having a pair of first cord insertion holes in a tube wall;
    (b) a slide having a stem portion to be slidably inserted in said outer tube from one end, said stem portion having a second cord insertion hole;
    (c) a plug having an insertion portion to be inserted in said outer tube from the other end;
    (d) mechanism provided between said outer tube and said plug for aligning said first cord insertion holes of said outer tube with said second cord insertion hole of said slide; and
    (e) mechanism provided between said outer tube and said plug for holding said plug in place so as to provide a resiliently urging mechanism by which said slide is resiliently urged upwardly in said outer tube;
wherein said aligning mechanism and said holding mechanism include:
    a number of guide grooves extending vertically in an inside surface of said tube wall of said outer tube from a lower end thereof, each of said guide grooves having at its lower end an aligning engagement portion and at its upper end a holding engagement portion; and
    a number of parallel extending locking strips of said plug, each of said locking strips having at its upper end a holding projection engageable selectively with said aligning engagement portion and said holding engagement portion.

11. A cord retainer according to claim 10, wherein said plug comprises a hollow of an insertion portion thereof, and wherein resiliently urging mechanism is a coil spring situated between a lower end of said stem of said slide and said bottom of said hollow of said hollow of said plug.

12. A cord retainer comprising:
    (a) an outer tube having a pair of first cord insertion holes in a tube wall;
    (b) a slide having a stem portion to be slidably inserted in said outer tube from one end, said stem portion having a second cord insertion hole;
    (c) a plug having an insertion portion to be inserted in said outer tube from the other end;
    (d) mechanism provided between said outer tube and said plug for aligning said first cord insertion holes of said outer tube with said second cord insertion hole of said slide; and
    (e) mechanism provided between said outer tube and said plug for holding said plug in place so as to provide a resiliently urging mechanism by which said slide is resiliently urged upwardly in said outer tube;

wherein said resiliently urging mechanism includes:

a pair of resilient legs extending from a lower end of said stem of said slide; and a cam surface extending as an inside surface of a hollow of an insertion portion of said plug, said cam surface having a frustoconical shape tapering toward a bottom of said hollow of said plug and being frictionally engageable with said resilient legs.

13. A cord retainer according to claim 12, wherein said resiliently urging mechanism is a coil spring situated between a lower end of said stem of said slide and said bottom of said hollow of said plug.

* * * * *